United States Patent [19]

Forsyth

[11] Patent Number: 4,561,919
[45] Date of Patent: Dec. 31, 1985

[54] INSULATED BEAD FOR A RADIAL STEEL PLY TIRE

[75] Inventor: Ronald J. Forsyth, Hartville, Ohio

[73] Assignee: GenCorp Inc., Akron, Ohio

[21] Appl. No.: 641,614

[22] Filed: Aug. 17, 1984

Related U.S. Application Data

[63] Continuation of Ser. No. 491,002, May 3, 1983, abandoned, which is a continuation-in-part of Ser. No. 297,441, Aug. 28, 1981, abandoned.

[51] Int. Cl.⁴ .............................................. B29H 17/34
[52] U.S. Cl. ..................................... 156/136; 156/295; 156/422; 156/460; 152/362 R; 152/539
[58] Field of Search ............... 156/136, 295, 422, 360; 152/362 R, 362 CS

[56] References Cited

U.S. PATENT DOCUMENTS

| | | | |
|---|---|---|---|
| 1,969,438 | 8/1934 | Warden | 156/136 |
| 2,904,095 | 9/1959 | Engstrom | 152/362 R |
| 3,106,952 | 10/1963 | Rudder | 152/362 |
| 3,949,800 | 4/1976 | Lejeune | 152/362 |
| 4,450,025 | 5/1984 | Henley | 156/460 |

FOREIGN PATENT DOCUMENTS

| | | | |
|---|---|---|---|
| 2458923 | 6/1975 | Fed. Rep. of Germany | 152/362 R |
| 2709578 | 3/1976 | Fed. Rep. of Germany | 152/362 R |

*Primary Examiner*—Lois E. Boland

[57] ABSTRACT

The positioning of fabric wrapped rubber insulation between a steel bead and a radial steel body ply eliminates failures in the bead areas of tires due to the direct contact of the steel body ply and bead bundle wires.

1 Claim, 3 Drawing Figures

INSULATED BEAD FOR A RADIAL STEEL PLY TIRE

This is a continuation of application Ser. No. 491,002, filed on May 3, 1983, now abandoned, which is a continuation-in-part of application Ser. No. 297,441, filed on Aug. 28, 1981, now abandoned.

The invention relates to an insulated bead for a radial steel ply tire.

Steel beads make it possible to securely affix tires to rims. Tire beads are made from coil wire. The individual strands of the wire may be coated with rubber and the plurality of rubber coated strands may be helically wrapped with a fabric of cord. U.S. Pat. No. 3,106,952 Rudder (1963) describes such a tire bead. The Rudder patent is directed primarily to wrapping the bead bundle with a heat-shrinkable material having widely spaced turns. During heat curing of the tire, the heat shrinkable material contracts and compresses the wound bead wires (bead bundle), preventing wild bead wires from entering the sidewall or other portion of the tire where they could cause damage. The heat shrinkable material does not keep the rubber around the bead bundle in place. It is also known in the prior art to wrap the bead bundle with rubber prior to adding a flipper to provide an insulating layer of rubber between the bead bundle and the next adjacent body ply. The addition of the rubber wrap did not eliminate failures in the bead area of steel ply radial tires. Wrapping a bead bundle with rubber and adding a flipper is discussed in "The Story of Tire Beads and Tires," Niles Standard 1954, pgs. 80–82.

The invention as claimed is intended to provide a remedy to the problem of providing rubber insulation in the area between the bead bundle and adjacent steel body ply of steel belted, steel ply radial tires. In the practice of the present invention, the bead wires and a steel body ply are unable to come into direct contact eliminating fretting and the resultant corrosion. Such corrosion may result in the ultimate failure of a tire.

The advantages offered by the present invention are that the rubber insulation which is applied to the bead bundle of rubber covered bead wires is tightly envelope wrapped then helically wrapped with a fabric covering which prevents movement of the insulation caused by turning the steel body ply up over the bead bundle by the pressures incurred during molding of the tire and by forces incurred during tire operation. For the purposes of the present invention, applying a flipper to a bead is not considered wrapping the bead.

There are a number of ways of carrying out the invention independent of the type of tire building drum employed. For example, a zero-crown drum tire building machine may be used.

One first envelope wraps the previously formed bead bundle with a layer of rubber; then applies a tight fabric cover, discussed below, which is helically wrapped and then zinc stearate or other lubricant is applied. The reason for this is that in forming a toroidal configuration from a flat drum, green components adjacent to the bead bundle must rotate in the tire. The lubricant allows the adjacent components to the bead bundle to rotate with a minimum of distortion. The fabric wrap holds the rubber around the bead bundle in place during the various tire building operations. In the finished tire, the above-described procedure prevents metal-to-metal contact between the bead and the body ply and the resulting fretting corrosion. The zinc stearate if used may be applied as a 6 percent suspension in isopropyl alcohol.

Further detail concerning the lubrication of the insulation layers is disclosed in commonly assigned copending application Ser. No. 338,765, filed Jan. 11, 1982, of Elder I. DePaul and John E. Semonin, now abandoned; which application is hereby incorporated by reference.

In the preferred embodiment, sufficient rubber is applied to the steel cord bundle to provide from 0.1 cm to 0.7 cm of additional rubber insulation in the area where the rubber covered bead wires come into proximity with a steel body ply. The fabric cover covers at least 80 percent and preferably 100 percent of the outer surface of the insulating layer. It is particularly important that the rubber insulating layer cover all areas of the bead that would otherwise be in contact with ply wire. When the fabric bead cover is helically wrapped onto the bead, the fabric is preferably nylon impregnated with rubber. The fabric used in the preferred helical wrap has a width of from 0.5 to 3.0 cm. It is also preferred that no bead filler strip be present inside of the wrap. Instead of separately covering the bead bundle with rubber and fabric, the bead bundle may be wrapped with a rubber-fabric laminate.

One way of carrying out the invention is described in detail below with reference to the drawings which illustrate these specific embodiments in which.

Figure 1:
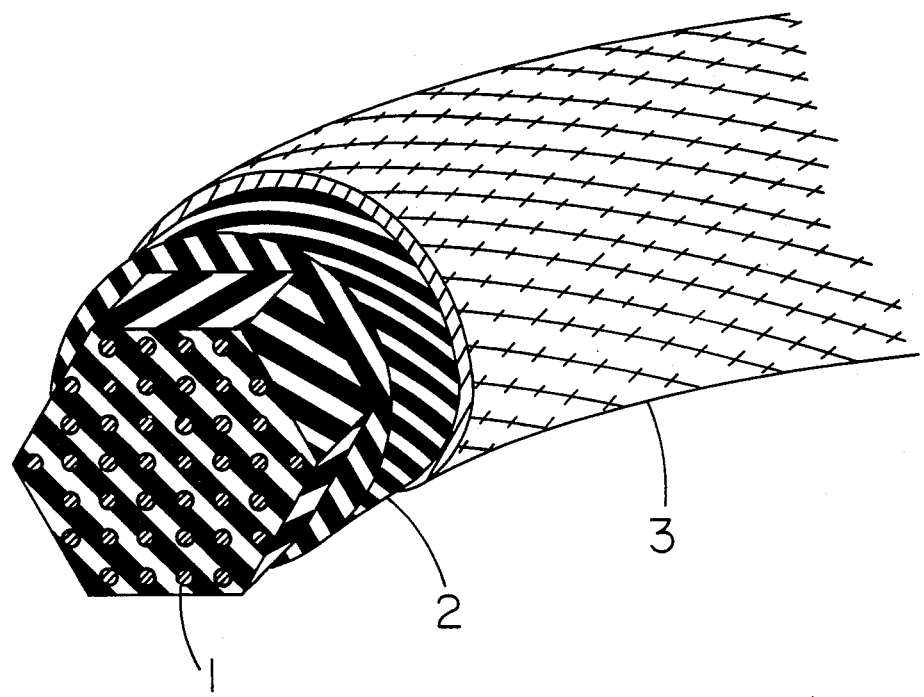
FIG. 1 is a cross-sectional view showing a hexagonal bead having a rubber and fabric cover.
Figure 2:
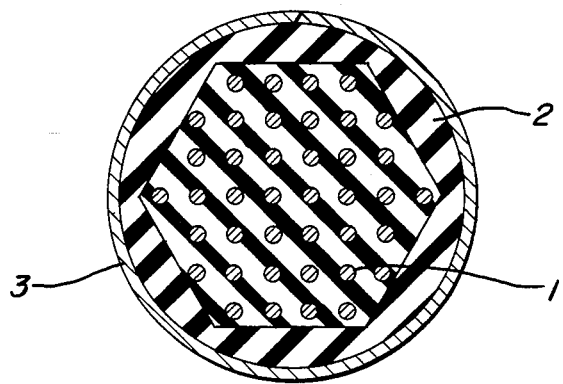
FIG. 2 is a hexagonal bead bundle covered with a layer of rubber and an outer cover of fabric and a lubricant covers the fabric.

In accordance with the invention, a hexagonal bead bundle is first formed by wrapping a single strand rubber covered wire 1 in a circular configuration to form a bead bundle having a cross-sectional configuration of 72 wires. The bead bundle has a cross-sectional diameter of 1.83 cm. The uncoated strand of wire has a diameter of 0.13 cm and is coated with a thickness of 0.013 cm of rubber. The bead forming machine is a National Standard Model 147 described in part in U.S. Pat. No. 3,741,263. The bead is then envelope wrapped with a strip of rubber having a typical width of 5.84 cm and a thickness of 0.20 cm. There is an overlap along the top surface of the bead. One machine used to apply the envelope wrap is a RJS Corporation; Model 147 Covering Machine; manufactured by RJS Corporation, Akron, Ohio. The rubber covered bead bundle is then helically wrapped with a fabric 3. The fabric is square woven nylon having a width of 1.59 cm and a thickness of 0.028 cm. The fabric is a tackified nylon 6.6 Leno woven material with a denier of 210. The wrapping machine employed is a National Standard Model BSW Spiral Bead Wrapping Machine manufactured by The N-S Machinery Division, Niles, Mich. The wrapped bead produced is then used to build a tire on a zero-crown drum in a conventional manner.

The tires produced by the present invention eliminate tire failure, due to the body ply fretting while in direct contact with the bead bundle. Tires produced without the fabric wrap over the rubber insulating compound may result in such a failure.

The green rubber used to wrap the bead preferably has a mooney viscosity of from 60 to 70 and when cured has a shore A hardness of from 84 to 92.

Another method of wrapping the bead bundle with rubber and fabric is set forth in application Ser. No. 462,284 of Virgil E. Henley, entitled Method and Apparatus For Wrapping A Tire Bead Ring now U.S. Pat. No. 4,450,025.

The entire disclosure of the Henley application is hereby incorporated by reference into this application. Both this application and the Henley application are assigned to The General Tire & Rubber Company.

The Henley invention is designed to apply a rubber cover around the bead bundle by the use of expanding bladders. The rubber cover is placed under the bead bundle. A bladder on one side expands and is pushed towards the bead bundle by push cans. The bladder forms the rubber cover around the bead bundle with its edge ending on the top surface of the bead. The other side performs the same operation, with the edge of the rubber cover overlapping the previously wrapped edge. The Henley invention thus forms an envelope wrap of rubber.

The cross sectional configuration of the rubber used to wrap the formed wire portion is not restricted to a particular shape. For example, when a circular configuration of the combination of formed wire and rubber wrapping is sought, the rubber which is formed by extrusion may have the cross section shown in FIG. 3. When the rubber cover has such configuration, it may expeditiously be applied using the above-mentioned Henley invention.

Figure 3:
FIG. 3 is a cross sectional representation of one form of cover used in the practice of the invention.

Using a cover of the type shown in FIG. 3 is desirable when a circular configuration is desired. The cover is placed around the hexagonal wire core which has a hexagonal cross section with the contoured side out and the opposite side in contact with the bead core. In a typical configuration for use in the bead of a commercially produced truck tire the strip has a width of 4.8 cm. The thickness at the thickest point is 0.375 cm and the middle portion a thickness of 0.2 cm. The high point is located 0.89 cm from the edge.

I claim:

1. In the method of constructing a radial steel belted, steel ply tire having steel beads adjacent the steel body ply, the improvement of said beads comprising:
    a. producing a first-stage composite by forming a strand of rubber covered steel wire into a multiple strand of substantially circular configuration, the cross-sectional area of said first-stage composite being of a substantially hexagonal shape, to form a bead bundle,
    b. producing a second-stage composite by tightly envelope wrapping said first-stage composite with green natural rubber insulation obtaining thereby a second-stage composite having a substantially circular cross-section,
    c. producing a third-stage composite by tightly helically wrapping said second-stage composite with a narrow width of fabric,
    d. coating said third-stage composite with an appropriate lubricant to produce a composite bead ring structure and
    e. thereafter assembling said composite bead ring structure with a radial steel body ply to form a radial steel belted, steel ply tire, said fabric preventing movement of said rubber insulation caused by the turning of said steel body ply up over the bead due to pressures incurred during molding of the tire and by forces incurred during tire operation and said composite bead ring structure preventing metal-to-metal contact between the steel of the bead and the steel of the body ply, fretting and corrosion.

* * * * *